(12) United States Patent
Blosco et al.

(10) Patent No.: US 8,971,443 B2
(45) Date of Patent: Mar. 3, 2015

(54) DYNAMICALLY ADJUSTING NUMBER OF TRANSMIT ANTENNAS FOR MIMO SYSTEMS TO USE GREATER TRANSMIT POWER

(71) Applicant: Cisco Technology, Inc., San Jose, CA (US)

(72) Inventors: John Blosco, Norton, OH (US); James Friedmann, Canton, OH (US); Greg Corsetto, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 9 days.

(21) Appl. No.: 13/780,598

(22) Filed: Feb. 28, 2013

(65) Prior Publication Data

US 2014/0205039 A1 Jul. 24, 2014

Related U.S. Application Data

(60) Provisional application No. 61/756,035, filed on Jan. 24, 2013.

(51) Int. Cl.
*H04L 27/00* (2006.01)
*H04B 7/06* (2006.01)
*H04B 7/04* (2006.01)

(52) U.S. Cl.
CPC ............ *H04B 7/0691* (2013.01); *H04B 7/0413* (2013.01); *H04B 7/0671* (2013.01)
USPC .......................................... 375/295; 375/285

(58) Field of Classification Search
CPC ... H04L 27/2647; H04L 27/368; H04L 27/34; H04L 27/362; H04L 5/0007; H04L 1/0003; H04L 1/0071; H04L 1/0618; H03F 1/3247; H04B 7/0669
See application file for complete search history.

(56) References Cited

U.S. PATENT DOCUMENTS

| 8,073,411 | B2 | 12/2011 | Blosco et al. | |
|---|---|---|---|---|
| 2005/0250452 | A1* | 11/2005 | Walton et al. | 455/63.4 |
| 2007/0253507 | A1* | 11/2007 | Zhou et al. | 375/267 |
| 2008/0051045 | A1* | 2/2008 | Hwang et al. | 455/127.2 |
| 2010/0164802 | A1* | 7/2010 | Li et al. | 342/372 |
| 2010/0285760 | A1 | 11/2010 | Blosco et al. | |
| 2012/0127929 | A1 | 5/2012 | Silverman et al. | |

\* cited by examiner

*Primary Examiner* — Vineeta Panwalkar
*Assistant Examiner* — Janice Tieu
(74) *Attorney, Agent, or Firm* — Edell, Shapiro & Finnan, LLC

(57) ABSTRACT

Techniques are presented to reduce the number of antennas used for a transmission for a given antenna configuration and data rate. At a wireless communication device having a plurality of antennas and capable of sending a transmission via one or more of the plurality of antennas, a determination is made of a data rate and antenna configuration to be used for a transmission. A comparison is made between a total transmit power for a minimum number of antennas for the data rate to be used for the transmission and a total transmit power associated with the antenna configuration for the transmission. When the total transmit power for a minimum number of antennas for the data rate is greater than the total transmit power associated with the antenna configuration for the transmission, the transmission is sent with the minimum number of antennas.

20 Claims, 3 Drawing Sheets

DYNAMICALLY ADJUSTING NUMBER OF TRANSMIT ANTENNAS FOR MIMO SYSTEMS TO USE GREATER TRANSMIT POWER

CROSS REFERENCE TO RELATED APPLICATION

This application claims priority to U.S. Provisional Application No. 61/756,035, filed Jan. 24, 2013, the entirety of which is incorporated herein by reference.

TECHNICAL FIELD

The present disclosure relates to wireless communication networks and devices.

BACKGROUND

In 2011, the Federal Communication Commission (FCC) in the United States reinforced its recommended guidance on how transmit signal power should be calculated for multiple-input multiple-output (MIMO) based systems. The interpretation of this ruling is that "uncorrelated" signal combining techniques, such as Cyclic Shift Delay (CSD), could be correlated over a "narrow" bandwidth and should be subject to the same maximum transmit power limitations as unintentional combining methods such as transmit beamforming. Prior to this recommendation, signals transmitted with CSD by MIMO devices have been treated as a "10log(Num_TX_Ant)" power addition, where "NUM_TX_Ant" is the number of transmit antennas. As a result of this regulation, signals transmitted with CSD will need to be treated as a "20log(Num_TX_Ant)" power addition.

In regulatory frequency bands that have strict maximum power guidelines, e.g., Unlicensed National Information Infrastructure-1 and 2 (UNII-1 and UNII-2) frequency bands in the United States, this ruling has the undesired effect of reducing the total radiated power when transmitting with CSD relative to prior products that were not subject to this ruling. The most dramatic effect of this is when signals are transmitted at lower spatial stream rates in the UNII-1 band. Extreme cases of this for a 4-transmitter architecture result in a 6 dB difference.

DESCRIPTION OF EXAMPLE EMBODIMENTS

Overview

In order to transmit packets at a higher total radiated power, a technique is presented herein to reduce the number of antennas used for a transmission for a given antenna configuration and data rate. At a wireless communication device having a plurality of antennas and capable of sending a transmission via one or more of the plurality of antennas, a determination is made of a data rate and antenna configuration to be used for a transmission. A comparison is made between a total transmit power for a minimum number of antennas for the data rate to be used for the transmission and a total transmit power associated with the antenna configuration for the transmission. When the total transmit power for a minimum number of antennas for the data rate is greater than the total transmit power associated with the antenna configuration for the transmission, the transmission is sent with the minimum number of antennas.

Example Embodiments

Generally, a process is presented herein for dynamically selecting parameters for sending a transmission via multiple antennas of a wireless device. This process operates as a "Correlated Gain Mask" that will reduce the number of antennas a packet is transmitted on when it is advantageous to do so.

Figure 1:
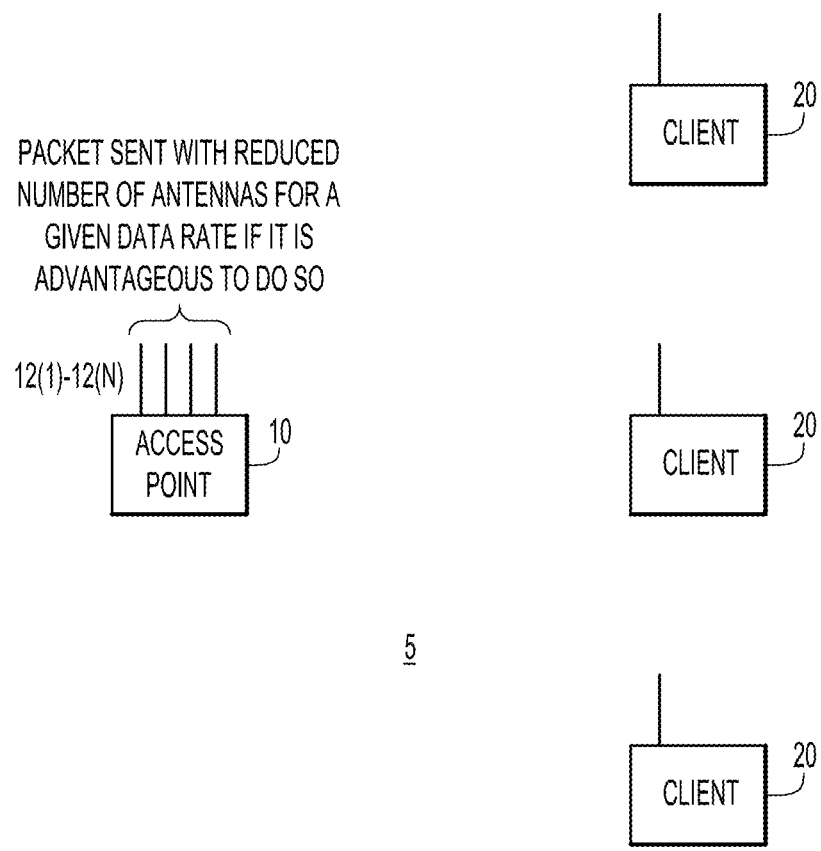
FIG. 1 is a system diagram showing a wireless network in which a wireless access point device is configured to serve one or more wireless client devices.

FIG. 1 shows a wireless network 5 comprising an access point 10 and a plurality of wireless client devices 20. The access point 10 has a plurality of antennas 12(1)-12(N), and sends wireless transmissions to client devices via its antennas 12(1)-12(N). According to the techniques presented herein, when a packet is to be transmitted via multiple antennas with spatial expansion (e.g., Cyclic Shift Delay), the access point 10 is configured to determine whether to transmit the packet with a reduced number of antennas for a given data rate and antenna configuration if it is advantageous to do so.

Figure 2:
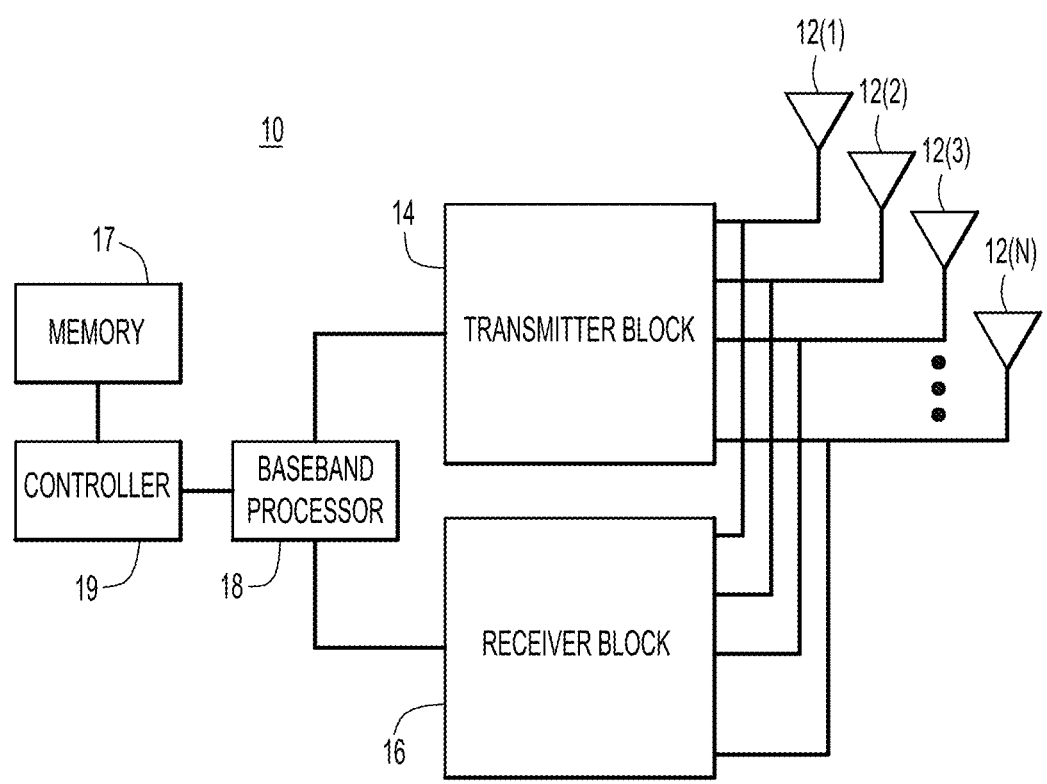
FIG. 2 is a block diagram of a wireless access point configured to perform a correlated gain mask to reduce the number of antennas a packet is transmitted with when advantageous to do so based on data rate, number of antennas configured by the user and frequency band in which the transmission is to be made.

Turning to FIG. 2, an example block diagram is shown of an access point 10 configured to apply the Correlated Gain Mask. The access point 10 includes a plurality of antennas 12(1)-12(N), a transmitter block 14, a receiver block 16, memory 17, a baseband processor (e.g., modem) 18 and a controller 19. The transmitter block 14 includes a plurality of radio frequency (RF) transmitters, each associated with one of the antennas. Similarly, the receiver block 16 includes a plurality of RF receivers each associated with one of the antennas. The controller 19 may be a microprocessor or microcontroller that executes instructions stored in memory 17 to carry out various high level control functions of the access point 10, as well as to perform the Correlated Gain Mask functions described herein.

The memory 17 may comprise read only memory (ROM), random access memory (RAM), magnetic disk storage media devices, optical storage media devices, flash memory devices, electrical, optical, or other physical/tangible memory storage devices. Thus, in general, the memory 17 may comprise one or more tangible (non-transitory) computer readable storage media (e.g., a memory device) encoded with software comprising computer executable instructions and when the software is executed (by the controller 19) it is operable to perform the operations described herein.

The baseband processor 18 may be implemented by one or more application specific integrated circuits (ASICs). The Correlated Gain Mask may be implemented by firmware in the baseband processor 18 or by software stored in memory 17 and executed by the controller 19.

The Correlated Gain Mask is applied to packets that are not beamformed from the plurality of antennas 12(1)-12(N) of the access point 10, such as packets transmitted with cyclic shift delay (CSD) techniques via multiple antennas.

Figure 3:
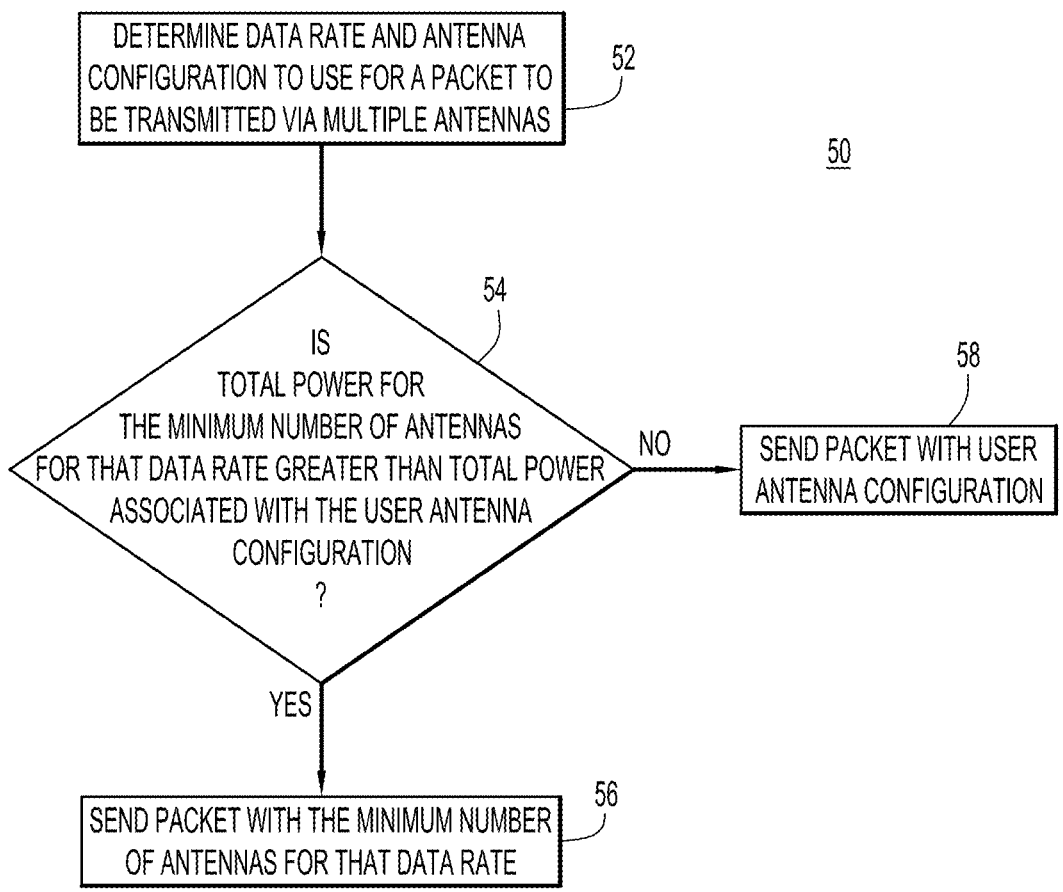
FIG. 3 is a flow chart generally depicting a process for determining when to transmit a packet with a reduced number of antennas.

Reference is now made to FIG. 3 for a description of a process 50 for the Correlated Gain Mask. At 52, the access point determines the parameters to be used for a transmission (e.g., a packet or frame, such as a management frame or packet) to be sent via one or more antennas with spatial expansion. The parameters may include data rate, frequency, antenna configuration (number of antennas) and power. These parameters are referred to herein as a "user configuration" insofar as they are determined by the basic configuration of the access point, through a command line interface or graphical user interface. At 54, a comparison is made. In particular, at 54, it is determined whether the TOTAL transmit power for the minimum number of antennas (needed for the transmission) for that data rate to be used for sending the packet is greater than the TOTAL transmit power for the number of antennas specified for the user antenna configuration. If the TOTAL transmit power for the minimum configurable number of antennas for that data rate is GREATER than that for the user antenna configuration, then the packet should be transmitted with the minimum configurable number of antennas, as shown at 56 in FIG. 3. As explained below, the total transmit power for the minimum number of antennas for that data rate and for the number of antennas for the user antenna configuration are determined based on data stored in the access point. The stored data consists of a total power value for various combinations of data rate, frequency and number of antennas. Otherwise, the packet is sent with the user antenna configuration (number of antennas) at 58. Consequently, the packet can be sent with a reduced number of antennas (and thus with greater power) if the comparison in 54 justifies it, but still satisfying the desired data rate for the packet. Again, the minimum number of antennas for the data rate is less than the number of antennas to be used for the transmission according to the user antenna configuration. Moreover, as depicted by the example pseudo-code below, it is determined in which of a plurality of frequency bands the transmission is to be made. When it is determined that the transmission is to be made in a frequency band for which it is not necessary to reduce the number of antennas to send the transmission for purposes of complying with power radiation regulatory limits, then the comparison operation of 54 is not performed (because it is not necessary to reduce the total transmit power by transmitting with a reduced number of antennas as in operation 56).

An example of pseudo-code for the process 50 is as follows:

CUR_FREQ—Current frequency of packet to be sent.
CUR_RATE—Current data rate of packet to be sent.
NUM_CONFIG_TX_ANT—Defined by the user via a command line interface or graphical user interface as the number of antennas configured for a transmission.
NUM_SET_TX_ANT—The number of antennas actually set to configure transmission of a packet.
MAX_TOT_POW(Num_Ant, Freq, Rate)—This is the maximum total transmit power for a given combination of data rate, frequency, and number of antennas. This information may be stored in tables in memory 17 of the access point 10, and is used in the comparison step 54 referred to above in connection with the description of FIG. 3 for comparing the total transmit power for the minimum number of antennas for a data rate with the total transmit power for the number of antennas of the user antenna configuration.

MIN_ANT—Minimum number of antennas for given data rate (e.g., 6-54 Mbps=1 antenna, M0-M7=1 antenna; M8-M15=2 antennas; M16-M23=3 antennas, Space Time Block Code (STBC) M0-M7=2 antennas).

DOMAIN—Current Configured Regulatory Domain (A, B, etc.).

BF_STATUS—TRUE if a packet is to be beamformed, FALSE if the packet is not to be beamformed.

```
DECIDE_MASK( ){
    IF( [BF_STATUS==FALSE] AND         The Mask should NOT be applied to any
beamformed packet
        [CUR_FREQ <5745) AND           Only apply to UNII1,2 and 2 Extended
        Bands
        [DOMAIN = A]){                 Only needed for the A domain
    APPLY_MASK( ){
        IF(MAX_TOT_POW(MIN_ANT,CUR_FREQ,CUR_RATE)>MAX_TOT_POW
(NUM_CONFIG_TX_ANT, CUR_FREQ, CUR_RATE)){NUM_SET_TX_ANT =
MIN_ANT}
        ELSE{ NUM_SET_TX_ANT = NUM_CONFIG_TX_ANT}
    }
```

The Correlated Gain Mask may use stored data for guidelines for the minimum number of transmit antennas for a given range of rates, e.g.:

Rate range 1 (6-54 Mbps, M0-M7): use 1 antenna
Rate range 2 (M8-M15, STBC M0-M7): use 2 antennas
Rate range 3 (M16-M23): use 3 antennas, and so on.

The Correlated Gain Mask extends the useable power options on the high end of the data rate range.

In summary, the foregoing techniques allow for transmitting packets at a higher total radiated power by scaling back (reducing) the number of antennas used for transmitting a packet for a given antenna configuration and data rate. This technique is useful for certain packets/frames, i.e., management frames such as Beacons intended to be received by multiple client devices. The additional power, e.g., 6 dB, that can be used for a transmission of a management frame using these techniques, increases the effective range of the access point due to higher transmit power at certain rates at the edge of a coverage area (cell) served by an access point.

From a method perspective, a method is provided comprising: at a wireless communication device having a plurality of antennas and capable of sending a transmission via one or more of the plurality of antennas, determining a data rate and antenna configuration to be used for the transmission; compare a total transmit power for a minimum number of antennas for the data rate to be used for the transmission with a total transmit power associated with the antenna configuration for the transmission; and when the total transmit power for a minimum number of antennas for the data rate is greater than the total transmit power associated with the antenna configuration for the transmission, sending the transmission with the minimum number of antennas.

From an apparatus perspective, an apparatus is provided comprising: a plurality of antennas; a transmitter configured to supply transmit signals to the plurality of antennas for transmission via corresponding ones of the plurality of antennas; a controller coupled to the transmitter, wherein the controller is configured to: determine a data rate and antenna configuration to be used for a transmission to be made; compare a total transmit power for a minimum number of antennas for the data rate to be used for the transmission with a total transmit power associated with the antenna configuration for the transmission; and cause the transmission to be sent the minimum number of antennas when the total transmit power for a minimum number of antennas for the data rate is greater than the total transmit power associated with the antenna configuration for the transmission.

In a software/computer readable storage media implementation, one or more computer readable storage media are provided encoded with instructions, and when executed, are operable to: determine a data rate and antenna configuration to be used for a transmission to be made via one or more of a plurality of antennas of a wireless communication device; compare a total transmit power for a minimum number of antennas for the data rate to be used for the transmission with a total transmit power associated with the antenna configuration for the transmission; and when the total transmit power for a minimum number of antennas for the data rate is greater than the total transmit power associated with the antenna configuration for the transmission, cause the transmission to be sent with the minimum number of antennas.

The above description is intended by way of example only.

What is claimed is:

1. A method comprising:
at a wireless communication device having a plurality of antennas and capable of sending a transmission via one or more of the plurality of antennas, determining a data rate and antenna configuration to be used for the transmission;
comparing a total transmit power for a minimum number of antennas for the data rate to be used for the transmission with a total transmit power associated with the antenna configuration for the transmission; and
when the total transmit power for the minimum number of antennas for the data rate is greater than the total transmit power associated with the antenna configuration for the transmission, sending the transmission with the minimum number of antennas.

2. The method of claim 1, wherein the minimum number of antennas for the data rate is less than a number of antennas of the antenna configuration.

3. The method of claim 1, wherein when the total transmit power for the minimum number of antennas for the data rate is less than the total transmit power for the antenna configuration for the transmission, sending the transmission with a number of antennas of the antenna configuration for the transmission.

4. The method of claim 1, wherein the transmission is a packet that is to be transmitted via the plurality of antennas without beamforming.

5. The method of claim 1, wherein the transmission is a packet is to be transmitted using cyclic shift delay techniques.

6. The method of claim 1, wherein the transmission is a management frame.

7. The method of claim 1, wherein determining further comprises determining in which of a plurality of frequency bands the transmission is to be made, and wherein comparing is not performed when it is determined that the transmission is to be made in one of the plurality of frequency bands band for which it is not necessary to reduce the number of antennas to send the transmission for purposes of complying with power radiation regulatory limits.

8. An apparatus comprising:
a plurality of antennas;
a transmitter configured to supply transmit signals to the plurality of antennas for transmission via corresponding ones of the plurality of antennas;
a controller coupled to the transmitter, wherein the controller is configured to:
determine a data rate and antenna configuration to be used for a transmission to be made;
compare a total transmit power for a minimum number of antennas for the data rate to be used for the transmission with a total transmit power associated with the antenna configuration for the transmission; and
cause the transmission to be sent the minimum number of antennas when the total transmit power for the minimum number of antennas for the data rate is greater than the total transmit power associated with the antenna configuration for the transmission.

9. The apparatus of claim 8, wherein the minimum number of antennas for the data rate is less than a number of antennas of the antenna configuration.

10. The apparatus of claim 8, wherein the controller is configured to cause the transmission to be sent with a number of antennas of the antenna configuration for the transmission when the total transmit power for the minimum number of antennas for the data rate is less than the total transmit power associated with the antenna configuration for the transmission.

11. The apparatus of claim 8, wherein the controller is configured to determine in which of a plurality of frequency bands the transmission is to be made, and to not perform the compare operation when it is determined that the transmission is to be made in one of the plurality of frequency bands band for which it is not necessary to reduce the number of antennas to send the transmission for purposes of complying with power radiation regulatory limits.

12. The apparatus of claim 8, wherein the controller is further configured to determine whether the transmission is to be sent with beamforming, and to perform the compare operation when it is determined that the transmission is not to be sent as a beamformed transmission.

13. The apparatus of claim 8, wherein the controller is configured to cause the transmission to be sent using cyclic shift delay techniques.

14. The apparatus of claim 8, wherein the controller is configured to cause the transmission to be sent without beamforming.

15. One or more non-transitory computer readable storage media encoded with instructions when executed are operable to perform the operations to:
determine a data rate and antenna configuration to be used for a transmission to be made via one or more of a plurality of antennas of a wireless communication device;
compare a total transmit power for a minimum number of antennas for the data rate to be used for the transmission with a total transmit power associated with the antenna configuration for the transmission; and
when the total transmit power for the minimum number of antennas for the data rate is greater than the total transmit power associated with the antenna configuration for the transmission, cause the transmission to be sent with the minimum number of antennas.

16. The non-transitory computer readable storage media of claim 15, wherein the minimum number of antennas for the data rate is less than a number of antennas of the antenna configuration.

17. The non-transitory computer readable storage media of claim 15, wherein when the total transmit power for the minimum number of antennas for the data rate is less than the total transmit power associated with the antenna configuration for the transmission, cause the transmission to be sent with a number of antennas of the antenna configuration for the transmission.

18. The non-transitory computer readable storage media of claim 15, wherein the instructions operable to determine comprise instructions operable to determine in which of a plurality of frequency bands the transmission is to be made, and wherein the compare operation is not performed when it is determined that the transmission is to be made in one of the plurality of frequency bands band for which it is not necessary to reduce the number of antennas to send the transmission for purposes of complying with power radiation regulatory limits.

19. The non-transitory computer readable storage media of claim 15, wherein the instructions operable to determine comprise instructions operable to determine whether the transmission is to be sent with beamforming, and to perform the compare operation when it is determined that the transmission is not to be sent as a beamformed transmission.

20. The non-transitory computer readable storage media of claim 15, further comprising instructions operable to cause the transmission to be sent using cyclic shift delay techniques.

* * * * *

UNITED STATES PATENT AND TRADEMARK OFFICE
CERTIFICATE OF CORRECTION

PATENT NO. : 8,971,443 B2  Page 1 of 1
APPLICATION NO. : 13/780598
DATED : March 3, 2015
INVENTOR(S) : John Blosco et al.

It is certified that error appears in the above-identified patent and that said Letters Patent is hereby corrected as shown below:

In the Claims

In Column 5, Line 63 after "bands" delete "band"

In Column 6, Line 34 before "for" delete "band"

In Column 7, Line 14 after "bands" delete "band"

Signed and Sealed this
Eighth Day of March, 2016

Michelle K. Lee
*Director of the United States Patent and Trademark Office*